May 11, 1943.　　　W. R. LINDEN　　　2,318,696
NOZZLE CLEANING TOOL
Filed Oct. 3, 1940
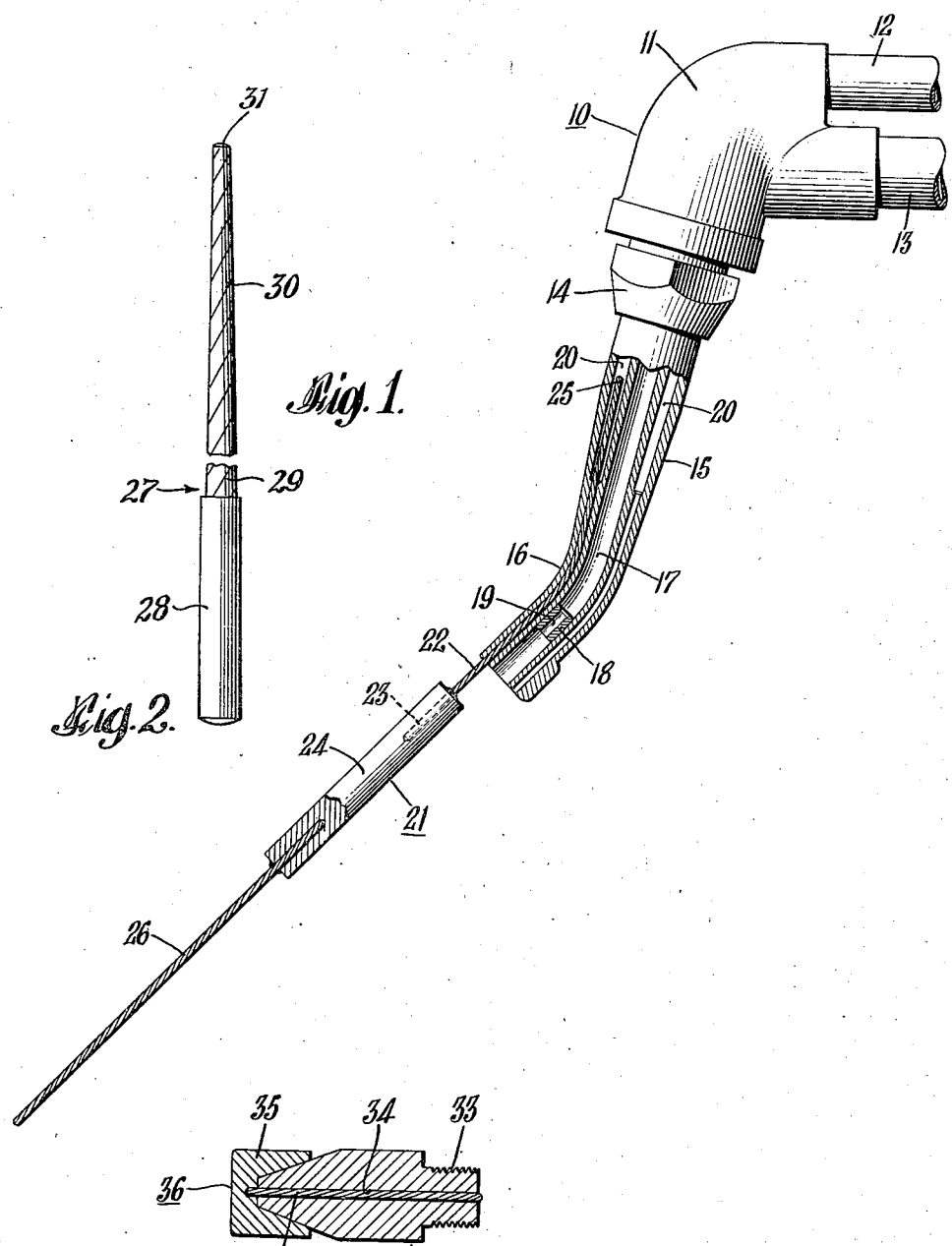
INVENTOR
WALTER R. LINDEN
BY
ATTORNEY Patented May 11, 1943

2,318,696

UNITED STATES PATENT OFFICE 2,318,696

NOZZLE CLEANING TOOL

Walter R. Linden, Palisades Park, N. J., assignor to Union Carbide and Carbon Corporation, a corporation of New York Application October 3, 1940, Serial No. 359,530

3 Claims. (Cl. 15—104)

This invention relates to blowpipe nozzle orifice cleaners, and particularly to a cleaning tool for removing carbon from the curved passageways of thermochemical gouging nozzles.

The nozzle orifices of cutting, welding and gouging blowpipes, for example, usually collect heavy layers of carbon and other foreign bodies upon the walls thereof. In the past, a common method of cleaning a curved passageway of a gouging nozzle was to insert in the orifice to be cleaned one end of a piece of flexible but solid steel wire of a diameter slightly smaller than that of the orifice, so that when the wire was forced into the orifice such end would follow the curved passageway, but in doing so it would scrape and damage the walls thereof if any sharp edges existed on the end of the wire. Further, by the insertion of such wire the loosened carbon was either wedged into possible interstices in the passage wall or was forced further up the passage. Another disadvantage in the use of a piece of solid wire was that operators in the habit of using a short snip of wire to clean the orifices of a blowpipe tip inevitably had the outer end of the short snip of wire cut or jabbed into their hands while manipulating the same.

Therefore, among the primary objects of the present invention are to provide a cleaning tool for nozzles which will neither scrape the walls of the orifices therein nor remove metal therefrom; to provide a nozzle cleaner that is safe and may be used by welding operators without fear of injury or accident to their hands. Another object of the invention is to provide a cleaning tool for blowpipe tips which also serves as a cap for protecting the end of the tip and especially the outlet orifice thereof from injury or damage in shipment or when not in use. A still further object of the invention is to provide a combined nozzle cleaning and protective tool that is simple and economical in its parts and very efficient and effective in operation.

The novel features which are believed to be characteristic of this invention are set forth with particularity in the appended claims. The invention itself, however, both as to its organization and method of operation, together with further objects thereof, will best be understood by reference to the specification taken in connection with the accompanying drawing.

Fig. 1 is a view partly in side elevation and partly in cross section of a blowpipe nozzle having a curved passageway being cleaned by a tool embodying features of the present invention;

Fig. 2 is an enlarged view in elevation of a nozzle cleaning tool of modified form; and Fig. 3 is a view in cross section of another modification of the invention wherein the handle serves as a protective cap for the end of the blowpipe tip, especially when not in use.

In accordance with the invention there is provided a nozzle cleaning tool consisting of a piece of multi-strand twisted wire cable fastened to a handle for removing carbon and other foreign particles from the internal walls of the orifices in blowpipe nozzles or tips. Provision may be made on the handle to receive a number identifying the particular nozzle or diameter of orifice with which the tool is to be used. Further, according to the invention, the free outer end of the tool may be swaged or otherwise drawn to a diameter slightly smaller than the original outside diameter thereof. The use of such tool has been found to be entirely satisfactory, because, with the free outer end of the cable properly rounded, both straight and curved gas' passages may be cleaned without distorting, scraping, removing or otherwise affecting the relatively soft metal constituting the walls of such orifice.

Further, in accordance with the invention, the handle itself may be made in the form of a cap which serves to protect the discharge end of the blowpipe nozzle when not in use or during shipment.

Referring to Fig. 1 of the drawing, there is shown a blowpipe 10 having a head 11 into which oxygen, and a mixture of oxygen and acetylene gas are delivered by way of an oxygen conduit 12, and an oxy-acetylene conduit 13. That portion of the blowpipe not shown may comprise any conventional oxy-acetylene cutting blowpipe provided with means for mixing oxygen and acetylene in the proper proportion for delivery through the conduit 13, and with a valve for controlling the delivery of cutting oxygen through the conduit 12. Threaded into the outlet end of the head 11 is a nut 14 which connects a gouging nozzle 15 in gas-tight relation with the usual internal seats of the blowpipe head 11. The gouging nozzle 15 may be curved at 16 and is provided with a central passageway 17 for oxygen. A spud 18 is disposed in the oxygen passageway 17 and is provided with a central orifice or passage 19 for metering the flow of oxygen discharged by the nozzle. The gouging nozzle 15 is also provided with a plurality of oxy-acetylene passages 20 surrounding the oxygen passage 17 in spaced relation thereto and to each other. The oxy-acetylene passages 20, and, in some cases, the oxygen passage 19, usually collect thick layers of carbon and other foreign bodies on the walls thereto in use.

For cleaning the nozzle orifices 19 and 20, there is provided, according to the invention, a nozzle cleaning tool 21 comprising a piece of twisted steel cable 22, one end 23 of which is securely fastened as by brazing into a socket in an axial piece of round metal stock 24 or other type of handle, the other end 25 of the twisted steel cable 22 being swaged or otherwise drawn to a diameter slightly smaller than the outside diameter of the twisted cable. Another twisted steel cable 26 entirely similar to the cable 22, except in diameter, is similarly fastened to the opposite end of the handle 24 for cleaning the oxygen orifice 19. Thus, the single tool 21 may be used to clean all of the gas outlet orifices of the blowpipe nozzle 15.

Referring to Fig. 2, there is shown a modification comprising a cleaning tool 27 similar to that described above in connection with Fig. 1 with the exception that a second cable at the end of the handle 28 opposite cable 29 is omitted. Also, a tapered portion 30 of the cable 29, for example, extending back from its free end 31 has a diameter slightly smaller than the remainder of the cable to facilitate insertion of the cable in a gas passage. The portion 30 of the cable 29 may be swaged or otherwise drawn to a diameter slightly smaller than the original outside diameter thereof.

Referring to Fig. 3, there is shown a welding blowpipe tip 32 having a threaded portion 33 adapted to be screwed into the stem of a welding blowpipe of conventional construction. The tip 32 is provided with a central longitudinal passageway 34 for the discharge of the oxy-acetylene gas, or other fluid, used in welding, for example, the tip itself being made of some soft metal, such as copper, the external surface of which may be chromium plated. In addition to collecting carbon and other foreign deposits, tips of this general type are subject to damage at their outlet ends in shipment or when thrown into a tool box. Any damage to the outlet orifice interferes with the discharge of the gas from the tip and causes backfiring and other trouble. Therefore, it is highly desirable that the outlet end of the passageway 34 be protected from damage in shipment or when not in use. According to the invention, such protection is provided by conforming the handle 35 of the cleaning tool 36 to constitute a cap which fits over the outer end of the welding nozzle 32. The cap or handle 35 may be made of any suitable material such as a plastic, or metal of some soft kind, such as aluminum or copper. One end of a twisted wire cable 37 is connected to the cap 35 in any suitable manner, as by being embedded therein when the handle cap 35 is molded. Thus, the member 35 serves as a protective cap for receiving the end of the nozzle 32 when not in use and as a holder or handle which may be turned to rotate the cable 37 to clean the passage 34 in the nozzle. The cable 34 preferably extends entirely through the passage 34 to prevent foreign matter from entering the rear end thereof while the cap 35 is in place, as shown.

It will be apparent to those skilled in the art that use of the nozzle cleaning tool of the present invention will neither scrape the walls of the orifices nor remove metal therefrom during the cleaning operation. In cleaning an orifice with the nozzle cleaning tool, the spiral groove between adjacent wires of the cable serves as a space for storing the loosened carbon particles and permits complete removal thereof from the orifice. Furthermore, the rounded wires which form the cable neither scrape nor cut the surface of the gas passage but tend to smooth out any irregularities which may exist therein.

A still further advantage of the cleaning tool of this invention becomes evident when employing it to clean curved passageways. One of the known methods heretofore used to clean curved passageways was by the insertion of a flexible steel wire slightly smaller than the diameter of the orifice. When this wire was inserted into the orifice it would follow the curved passageway but in doing so it would inevitably scrape the walls thereof if any sharp edges existed on the end of the wire. Furthermore, by the insertion of such wire the loosened carbon was either wedged into any existing interstices in the passage walls or was forced further up the passage. With the improved device of this invention, however, a large percentage of the loose carbon, whether it is in a straight or curved passage, is removed therefrom leaving the passage free of all foreign particles.

The handle at the end of the cable protects the operator from injury, and the use of cleaning tools of the correct size not only eliminates the possibility of cuts, but also maintains a longer lasting nozzle with better flame characteristics.

While there have been described what are at present considered to be preferred embodiments of this invention, it will be obvious to those skilled in the art that various changes and modifications may be made therein without departing from the invention, and it is therefore intended in the appended claims to cover all such changes and modifications as fall within the true spirit and scope of the invention.

I claim:

1. A tool for cleaning both straight and curved gas passages in blowpipe nozzles, said tool comprising a single piece of substantially round stock of solid material constituting a handle for the tool and having an axial socket in one end thereof; and a piece of multi-strand flexible metal cable having one end thereof projecting into said socket and permanently secured to such one-piece handle, a portion of said cable extending back from its other end having a diameter slightly smaller than the remainder of said cable to facilitate insertion of the cable in a gas passage, the strands of said cable being twisted to provide longitudinal grooves between adjacent strands serving to receive loosened foreign particles for removing the latter from a gas passage in a nozzle.

2. A tool as claimed in claim 1, wherein said handle is shaped around said socket to closely fit, and serve as a protective cap for, the outlet end of a blowpipe nozzle when said cable is inserted into the gas passage of such nozzle, and said cable is of sufficient length to extend entirely through said passage when said cap is fitted to said nozzle, to thereby prevent foreign matter from entering either end of said passage.

3. A tool for cleaning both straight and curved gas passages in blowpipe nozzles, said tool comprising a handle; and a piece of multi-strand flexible metal cable having one end thereof secured to such handle, a portion of said cable extending back from its other end having a diameter slightly smaller than the remainder of said cable to facilitate insertion of the cable in a gas passage.

WALTER R. LINDEN.